United States Patent Office 3,542,587
Patented Nov. 24, 1970

3,542,587
RADIATION CURABLE PAINT CONTAINING A VINYL ESTER BINDER RESIN HAVING PENDANT DIESTER GROUPS
Elihu J. Aronoff, Southfield, and Ernest O. McLaughlin, Detroit, Mich., assignors to Ford Motor Company, Dearborn, Mich., a corporation of Delaware
No Drawing. Filed July 1, 1968, Ser. No. 741,315
Int. Cl. C08f 15/10
U.S. Cl. 117—93.31    2 Claims

ABSTRACT OF THE DISCLOSURE

A radiation-curable paint comprising a vinyl monomeric component and a vinyl polymeric component having two or more diester side chains of the following structural formula:

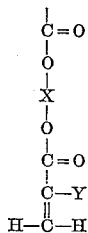

wherein X is a $C_2$–$C_{10}$ alkyl, $C_5$–$C_6$ cycloalkyl, or $C_2$–$C_{10}$ polyalkyleneoxy divalent radical and Y is a hydrogen or methyl radical, and a substrate coated therewith.

---

Painting a substrate with a fine-forming liquid comprising a solution of olefinically unsaturated polymers in vinyl monomers and a method for effecting uniform cure of such film with an electron beam is described by W. J. Burlant in U.S. Pat. 3,247,012. This invention relates to novel, electron-curable, paints, particularly the vinyl polymers used therein, and to their preparation and use.

The unique, alpha-beta olefinically unsaturated, polymers, hereinafter termed "binder resins," of this invention are copolymers of vinyl monomers, including at least one hydroxyl bearing constituent monomer, which have been reacted with an unsaturated acyl halide. These binder resins are characterized by having pendant from carbon atoms of the principal carbon-to-carbon chain two or more diester side chains of the following structural formula:

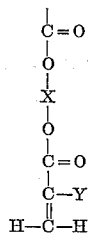

wherein X is a $C_2$–$C_{10}$ alkyl, $C_5$–$C_6$ cycloalkyl, or $C_2$–$C_{10}$ polyalkyleneoxy divalent radical and Y is a hydrogen or methyl radical.

The term "paint" is herein meant to include finely divided pigment and/or particulate filler in a film-forming, resin comprising, binder and the binder, which is ultimately converted to a weather and wear resistant film, can be all or virtualy all that is used to form the film, or it can be a vehicle for pigmentary and/or particulate filler material.

The electron beams employed herein for polymerization, i.e. crosslinking the monomer-resin paint binder solutions, are advantageously the emission product of a cathode ray tube electron accelerator. Such beam preferably has an average energy of about 100,000 to about 450,000 electron volts.

The term "constituent monomer" as used herein refers to a given compound used in forming a copolymer of this invention and not to the number of its occurrences therein.

The vinyl binder resins have molecular weights in the range of about 1,000 to about 50,000 or higher, preferably in the range of about 5,000 to about 40,000 and have about 0.3 to about 5.0, preferably about 0.5 to about 3.0, alpha-beta olefinic unsaturation units per 1,000 units molecular weight. The amount of vinyl monomer used with such resins can be varied within the hereinafter stated ranges in accordance with the monomer or monomers used, the molecular weight of the resin, and with the concentration of alpha-beta olefinic unsaturation units therein.

The paint binder solutions contain about 10 to about 90, commonly about 30 to about 65, weight percent vinyl monomers on a pigment and/or particulate filler free basis. The vinyl monomer component may consist of a single compound or may be a mixture of two or more different monomeric compounds. Exemplary vinyl monomers include, but not by way of limitation, methyl methacrylate, ethyl acrylate, butyl acrylate, butyl methacrylate, styrene, acrylonitrile, methacrylonitrile, acrylic acid, methacrylic acid, etc.

The intermediates from which the binder resins are prepared may be formed by conventional free radical initiated copolymerization using two or more, preferably three or more, vinyl monomers at least one of which has a free or pendant hydroxyl group within its molecular structure, e.g. hydroxy ethyl methacrylate. In the preferred embodiment, all of the copolymerized monomers are esters of acrylic acid and/or methacrylic acid. In another embodiment, equimolar quantities of acrylic acid and/or methacrylic acid are substituted for one of the acrylates or methacrylates or a portion thereof. In another embodiment, equimolar quantities of a vinyl hydrocarbon, e.g. styrene, are substituted for one of the acrylates or methacrylates or a portion thereof. Where special properties are desired, other vinyl monomers may be substituted in like manner, e.g. acrylonitrile, ortho chlorostyrene, para bromostyrene, butyl vinyl ether, vinylidene chloride, methacrylonitrile, 2 vinyl pyridine, 4 vinyl pyridine, etc. The properties of the resin may also be modified by employing as constituted monomers various dienes, e.g. butadiene, isoprene, 2-chlorobutadiene, etc.

The resultant copolymers have side chains pendant from the principal carbon to carbon chain which are characterized by the following structure:

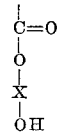

wherein X is a $C_2$–$C_{10}$ alkyl, $C_5$–$C_6$ cycloalkyl, or $C_2$–$C_{10}$ polyalkyleneoxy divalent radical.

At least a portion of the pendant hydroxyl groups of the resultant copolymer are then reacted with an unsaturated acyl halide to yield a polymer having side chain terminal unsaturation and a structure corresponding to that hereinbefore illustrated. In a preferred embodiment, the amount of acyl halide used is sufficient to effect reaction of about 20% to about 95% of the available hydroxyl groups, varying within such range to correspond in inverse relationship with the concentration of such groups in the intermediate. The concentration of such hydroxyl groups in the intermediate is advantageously in the range of about 0.3 to about 7.0, preferably about 0.5 to about 3.0, per 1,000 units molecular weight. In some applications, it is advantageous to leave unreacted hydroxyl groups on the polymer to improve adhesion properties of the paint.

In the past, the better polymers employed for this purpose have obtained the requisite unsaturation by employing glycidyl methacrylate as a constituent monomer in the initial formation of the polymer or by postreacting the same with a carboxyl bearing polymer. The instant method for producing radiation sensitive paint binder resins is simple and selective. Competing side reactions, e.g. reactions leading to gel formation, which are prevalent with glycidyl-carboxyl reactions are essentially absent in this method. Control of the concentration of hydroxyl groups upon the intermediate and ultimately control of the concentration of terminal unsaturation in the resin is greatly facilitated. Other active hydrogen containing monomers such as acrylic acid, acrylamide, etc., can be used with greater safety as additional components of the copolymers. The paint binder resins thus produced exhibit improved storage stability and excellent curing properties.

The paint binders of this invention may be applied as liquid films to substrates by conventional means, e.g. spraying, roll coating, curtain coating, brushing, etc. The films applied will be commonly in the range of about 0.1 to about 4, more commonly 0.5 to 1.5 mils average thickness.

The following examples are illustrative of the binder resins of this invention, the method of their preparation and their use.

EXAMPLE 1

An electron-polymerizable paint is prepared from the following materials in the manner hereinafter set forth:

STEP I.—PREPARATION OF VINYL COPOLYMER INTERMEDIATE

| | Grams | Mols |
|---|---|---|
| (1) Methyl methacrylate | 400 | 4.0 |
| (2) Ethyl acrylate | 400 | 4.0 |
| (3) Hydroxy ethyl methacrylate | 195 | 1.5 |
| (4) Toluene | 1,000 | |
| (5) Benzoyl peroxide | 30 | |

The benzoyl peroxide is dissolved in a solution of the methyl methacrylate, ethyl acrylate, and hydroxy ethyl methacrylate and one-half of the toluene. This solution is added incrementally to the remainder of the toluene at reflux over a seven-hour period with a final pot temperature of about 138–140° C. Reflux is maintained for another three hours and the solution cooled.

STEP II.—PREPARATION OF PAINT BINDER RESIN

| | Grams | Mols |
|---|---|---|
| (1) Solution from Step I | 500 | * 0.375 |
| (2) Acrylyl chloride | 33.8 | 0.375 |
| (3) Toluene | 30 | |

* Mol OH.

The solution from Step I is heated to 60° C. and a solution of the acrylyl chloride and toluene are added dropwise over a four-hour period while the temperature is allowed to rise to about 90° C. After heating for another 2.5 hours, conventional infrared analysis of the solution reveals about 14% residual hydroxyl in the resin. About 544 grams of the resultant solution is recovered having a Gardner Holdt viscosity of B-C. This solution is subjected to vacuum below 10 mm. Hg at 70° C. and 241 grams of acrylic polymer are recovered.

Step III.—Preparation of paint

| | Weight percent |
|---|---|
| (1) Resin from Step II | 29.88 |
| (2) Methyl methacrylate | 36.14 |
| (3) Mineral pigment | 24.53 |
| (4) Carbon black | 3.58 |
| (5) Methyl methacrylate | 5.87 |

Components (1)–(4) are mixed and placed in a pebble mill until the pigment is uniformly dispersed. Component 5, methyl methacrylate, is added to the resultant mix. The paint is then applied as a 1.5 mil film to a polymeric substrate (ABS—acrylonitrile-butadiene-styrene copolymer) by conventional spray techniques and cured thereon with a cathode ray tube-generated electron beam in a nitrogen atmosphere. The conditions of irradiation are as follows:

Average beam energy—250 kv.
Current—25 milliamperes
Total dose—13 megarad

EXAMPLE 2

The procedure of Example 1 is repeated with a modification of Step II thereof wherein 50 grams of acrylyl chloride are admixed with the 500 grams of the solution containing the vinyl copolymer of Step I. The acrylyl chloride and the toluene are added to the solution of vinyl polymer over a three-hour period and then heated at 100° C. for three additional hours. Infrared analysis reveals a maximum of 11% hydroxyl unreacted. The solution has a Gardner Holdt viscosity of A. The excess acrylyl chloride is stripped with the toluene.

EXAMPLE 3

An electron-polymerizable paint is prepared from the following materials in the manner hereinafter set forth:

Step I.—Preparation of vinyl copolymer intermediate

| | Grams |
|---|---|
| (1) Methyl methacrylate | 200.0 |
| (2) Eethyl acrylate | 66.6 |
| (3) Hydroxy ethyl methacrylate | 22.0 |
| (4) Benzoyl peroxide | 8.7 |
| (5) Xylene | 300.0 |

A solution of Items 1, 2, 3 and 4 and one-half of Item 5 are added to the remainder of Item 5 at 137° C. over a six-hour period.

Step II.—Preparation of paint binder resin

| | Grams |
|---|---|
| (1) Methacrylyl chloride | 24 |
| (2) Xylene | 50 |

A solution of the methacrylyl chloride is dripped into the resultant solution of Step I at 80° C. and postheated for two hours. Solvent is distilled while the pressure is reduced and the temperature raised to a final temperature at 80° C. About 257 grams of the resultant resin are recovered.

Step III.—One-half of the film-forming paint binder resin of Step II is mixed with an equimolar amount of methyl methacrylate, pigmented by conventional means, further diluted with methyl methacrylate to spraying viscosity, and sprayed upon a substrate to an average thickness of about 1 mil.

Step IV.—The remaining half of the film-forming paint binder resin is mixed with methyl methacrylate to a viscosity suitable for spraying and the resulting unpigmented solution is sprayed upon a substrate to an average thickness of about 2 mils.

Step V.—The coatings applied to substrates in Steps III and IV are polymerized thereon by passing the substrates through an electron beam in a nitrogen atmosphere. The conditions of irradiation are as follows:

Potential—295 kv.
Current—25 milliamperes
Total dose—15 megarad

EXAMPLE 4

Electron-polymerizable paints are prepared from the following materials in the manner hereinafter set forth:

STEP I.—PREPARATION OF VINYL COPOLYMER INTERMEDIATES

|  | A | | B | |
| --- | --- | --- | --- | --- |
|  | Grams | Mols | Grams | Mols |
| (1) Methyl methacrylate | 200.0 | 2.0 | 400.0 | 4.0 |
| (2) Ethyl acrylate | 200.0 | 2.0 | 400.0 | 4.0 |
| (3) Hydroxy ethyl methacrylate | 97.5 | 0.75 | 195.0 | 1.5 |
| (4) n-Dodecyl mercaptan | 5.0 | | 20.0 | |
| (5) Benzoyl peroxide | 15.0 | | 30.0 | |
| (6) Xylene | 300.0 | | 700.0 | |
| (7) Xylene | 300.0 | | 300.0 | |
| (8) Hydroquinone | 0.2–0.3 | | 0.2–0.3 | |
| (9) Methacrylyl chloride | 95.0 | | 180 | |
| (10) Xylene, ml | 100 | | 100 | |

Separate solutaions are prepared of items (1)–(6) of A and B and added to the corresponding Items 7 at reflux over about six hours and refluxed for an additional three hours. About 0.2–0.3 gram of (8) is added to each.

Steps II.—Preparation of paint binder resin

Solutions of (9) and (10) are added dropwise while increasing the temperature gradually to 110° C. On cessation of gas evolution, the samples are stripped of solvent under vacuum to yield 546 and 1,114 grams respectively of the respective resins.

Step III.—Application and curing of paint

These resins are pigmented, sprayed upon substrates and polymerized with an electron beam as in the previous examples. Total doses of 10, 12 and 15 megarad are applied to separate substrates thus coated.

EXAMPLE 5

Electron-polymerizable paints are prepared from the following materials in the manner hereinafter set forth:

STEP I.—PREPARATION OF VINYL COPOLYMER INTERMEDIATES

|  | A | | B | |
| --- | --- | --- | --- | --- |
|  | Grams | Mols | Grams | Mols |
| (1) Methyl methacrylate | 179.0 | 1.79 | 133.0 | 1.33 |
| (2) Ethyl acrylate | 358.0 | 3.58 | 267.0 | 2.67 |
| (3) Hydroxy ethyl methacrylate | 130.0 | 1.00 | 44.5 | 0.33 |
| (4) Xylene | 1334.0 | | 889.0 | |
| (5) n-Dodecyl mercaptan | 20.0 | | 13.3 | |
| (6) Benzoyl peroxide | 20.0 | | 13.3 | |
| (7) Methacrylyl chloride | 114.0 | | 40.0 | |
| (8) Xylene | 87.0 | | 44.0 | |

Separate solutions are prepared of items (1), (2), (3), (5) and (6) in one-half of (4) to the remainder of (4) at reflux over an eight-hour period under a nitrogen atmosphere and heating is continued for about one and one-half hours.

Step II.—Preparation of paint binder resin

Solutions of (7) in (8) were then added dropwise to the acrylic copolymer solutions of Step I maintained at 60–85° C. and the reaction mixtures are subsequently subjected to vacuum to recover respectively 805 and 431 grams of resin.

Step III.—Application and curing of paint

These resins are pigmented, sprayed upon substrates and polymerized with an electron beam as in the previous examples.

EXAMPLE 6

The procedure of Example 1 is repeated except that the paint binder resin is prepared from the following materials employed in the relative amounts stated:

|  | Mol ratio | Mol percent |
| --- | --- | --- |
| Methyl methacrylate | 3.0 | 27.78 |
| Ethyl acrylate | 5.0 | 46.30 |
| Hydroxy ethyl methacrylate | 1.4 | 12.96 |
| Methacrylyl chloride | 1.4 | 12.96 |

EXAMPLE 7

The procedure of Example 1 is repeated to prepare four paint binders having the same constituent monomers in differing concentrations.

|  | A | B | C | D |
| --- | --- | --- | --- | --- |
| Methyl methacrylate | 27.78 | 55.56 | 36.09 | 20.54 |
| Ethyl acrylate | 46.30 | 18.52 | 27.39 | 29.46 |
| Hydroxy ethyl methacrylate | 12.96 | 12.96 | 18.26 | 25.00 |
| Methacrylyl chloride | 12.96 | 12.96 | 18.26 | 25.00 |

The resultant binder resins are admixed with vinyl monomer, pigmented, admixed with additional vinyl monomer to paint application viscosity and cured by an electron beam in accordance with the procedure of Example 1.

EXAMPLE 8

The procedure of Example 1 is repeated except that the coating is applied to and cured upon a substrate of wood.

EXAMPLE 9

The procedure of Example 1 is repeated except that the coating is applied to and cured upon a steel substrate. substrate.

EXAMPLE 10

The procedure of Example 1 is repeated except that the coating is applied to and cured upon a steel substrate.

EXAMPLE 11

The procedure of Example 1 is repeated except that the coating is applied to and cured upon a paper substrate.

EXAMPLE 12

The procedure of Example 1 is repeated except that the coating is applied to and cured upon a substrate of glass.

EXAMPLE 13

The procedure of Example 1 is repeated with equimolar amounts of hydroxypropyl methacrylate substituted for hydroxy ethyl methacrylate.

EXAMPLE 14

The procedure of Example 1 is repeated with equimolar amounts of hydroxy ethyl acrylate substituted for the hydroxy ethyl methacrylate.

EXAMPLE 15

The procedure of Example 1 is repeated with equimolar amounts of hydroxypropyl acrylate substituted for the hydroxy ethyl methacrylate.

EXAMPLE 16

The procedure of Example 1 is repeated with equimolar amounts of decamethylene glycol monomethacrylate substituted for the hydroxy ethyl methacrylate.

EXAMPLE 17

The procedure of Example 1 is repeated with equimolar amounts of cyclohexylene glycol monomethacrylate substituted for the hydroxy ethyl methacrylate.

EXAMPLE 18

The procedure of Example 1 is repeated with equimolar amounts of diethylene glycol monomethacrylate substituted for the hydroxy ethyl methacrylate.

EXAMPLE 19

The procedure of Example 1 is repeated with equimolar amounts of tetraethyleneoxy monomethacrylate substituted for the hydroxy ethyl methacrylate.

EXAMPLE 20

The procedure of Example 1 is repeated with equimolar amounts of acrylonitrile substituted for the methyl methacrylate employed in forming the vinyl copolymer intermediate.

EXAMPLE 21

The procedure of Example 1 is repeated with equimolar amounts of styrene substituted for the ethyl acrylate.

EXAMPLE 22

The procedure of Example 1 is repeated with equimolar amounts of styrene substituted for the methyl methacrylate in forming the vinyl copolymer intermediate.

EXAMPLE 23

The procedure of Example 1 is repeated with equimolar amounts of ortho chlorostyrene substituted for the ethyl acrylate.

EXAMPLE 24

The procedure of Example 1 is repeated with equimolar amounts of para bromostyrene substituted for the ethyl acrylate.

EXAMPLE 25

The procedure of Example 1 is repeated with equimolar amounts of acrylic acid substituted for one-half of the methyl methacrylate employed in forming the vinyl copolymer intermediate.

EXAMPLE 26

The procedure of Example 1 is repeated with equimolar amounts of methacrylic acid substituted for one-half of the methyl methacrylate employed in forming the vinyl copolymer intermediate.

EXAMPLE 27

The procedure of Example 1 is repeated except that 2 moles of butyl vinyl ether are substituted for 2 moles of the ethyl acrylate.

EXAMPLE 28

The procedure of Example 1 is repeated except that 2 moles of vinylidene chloride are substituted for 2 moles of ethyl acrylate.

EXAMPLE 29

The procedure of Example 1 is repeated except that 2 moles of methacrylonitrile are substituted for 2 moles of ethyl acrylate.

EXAMPLE 30

The procedure of Example 1 is repeated except that 2 moles of vinyl pyridene are substituted for 2 moles of ethyl acrylate.

EXAMPLE 31

The procedure of Example 1 is repeated except for Step I wherein the vinyl copolymer intermediate is the reaction product of a styrene-maleic anhydride alternating copolymer and ethylene glycol, said reaction product being formed at a temperature of about 135° C.

EXAMPLE 32

The procedure of Example 1 is repeated except that the paint binder resin is applied in a solution of vinyl monomers consisting of a mixture of methyl methacrylate, styrene and butyl acrylate.

EXAMPLE 33

The procedure of Example 1 is repeated except that the paint binder resin is applied in a solution of vinyl monomers consisting of a mixture of styrene, ethyl acrylate, butyl methacrylate and methacrylic acid.

EXAMPLE 34

The procedure of Example 1 is repeated except that the paint binder resin is applied in a solution of vinyl monomers consisting of a mixture of methyl methacrylate, acrylic acid, acrylonitrile and butyl methacrylate.

EXAMPLE 35

The procedure of Example 1 is repeated except that the paint binder resin is applied in a solution of styrene monomers and ethyl acrylate.

The foregoing examples are solely for purposes of illustration and should not be considered as limitations upon the true scope of the invention as set forth in the following appended claims.

We claim:

1. An article of manufacture comprising in combination a substrate and a coating of paint cured thereon by exposure to an electron beam having average energy in the range of about 100,000 to about 450,000 electron volts, said coating comprising the crosslinked polymerization product of
   (1) a vinyl monomer component consisting essentially of a major portion of vinyl monomers selected from styrene and esters of a $C_1$–$C_4$ monohydric alcohol and acrylic or methacrylic acid and a minor portion of vinyl monomers selected from esters of a $C_1$–$C_4$ monohydric alcohol and acrylic or methacrylic acid, styrene, methacrylic acid, acrylic acid, acrylonitrile and methacrylonitrile, and
   (2) an alpha-beta olefinicially unsaturated vinyl polymer formed by reacting an unsaturated acyl halide selected from acrylyl chloride and methacrylyl chloride with a copolymer of vinyl monomers formed by copolymerization of at least one hydroxyalkyl acrylate or methacrylate with a major amount of vinyl monomers selected from esters of a $C_1$–$C_4$ monohydric alcohol and acrylic or methacrylic acid and a minor amount of vinyl monomers selected from esters of a $C_1$–$C_4$ monohydric alcohol and acrylic or methacrylic acid, styrene, halogen substituted styrenes, acrylic acid, methacrylic acid, butyl vinyl ether, acrylonitrile, methacrylonitrile, vinylidene chloride, and vinyl pyridine.

2. A paint curable by exposure to an electron beam having average energy in the range of between about 100,000 and about 450,000 electron volts which comprises a film-forming solution of
   (1) a vinyl monomer component consisting essentially of a major portion of vinyl monomers selected from styrene and esters of a $C_1$–$C_4$ monohydric alcohol and acrylic or methacrylic acid and a minor portion of vinyl monomers selected from esters of a $C_1$–$C_4$ monohydric alcohol and acrylic or methacrylic acid, styrene, methacrylic acid, acrylic acid, acrylonitrile and methacrylonitrile, and (2) an alpha-beta olefinically unsaturated vinyl polymer formed by reacting an unsaturated acyl halide selected from acrylyl chloride and methacrylyl chloride with a copolymer of vinyl monomers formed by copolymerization of at least one hydroxyalkyl acrylate or methacrylate with a major amount of vinyl monomers selected from esters of a $C_1$–$C_4$ monohydric alcohol and acrylic or methacrylic acid and a minor amount of vinyl monomers selected from esters of a $C_1$–$C_4$ monohydric alcohol and acrylic or methacrylic acid, styrene, halogen substituted styrenes, acrylic acid, methacrylic acid, butyl vinyl ether, acrylonitrile, methacrylonitrile, vinylidene chloride, and vinyl pyridine.

References Cited

UNITED STATES PATENTS

| | | | |
|---|---|---|---|
| 3,247,012 | 4/1966 | Burlant | 117—93.31 |
| 3,301,743 | 1/1967 | Fekete et al. | 161—194 |
| 3,448,089 | 6/1969 | Celeste | 260—78.5 |

SAMUEL H. BLECH, Primary Examiner

J. SEIBERT, Assistant Examiner

U.S. Cl. X.R.

117—124, 132, 148, 155, 161; 204—159.15; 260—41, 85.5, 875, 881, 885